(12) United States Patent
Khatua

(10) Patent No.: US 9,369,763 B2
(45) Date of Patent: Jun. 14, 2016

(54) METHODS AND SYSTEMS FOR FACILITATING MEDIA SERVICE PERSONALIZATION BY WAY OF A CAPACITIVE SENSING REMOTE CONTROL DEVICE

(71) Applicant: Verizon Patent and Licensing Inc., Arlington, VA (US)

(72) Inventor: Chidananda Khatua, Sunnyvale, CA (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 80 days.

(21) Appl. No.: 14/502,849

(22) Filed: Sep. 30, 2014

(65) Prior Publication Data
US 2016/0094881 A1    Mar. 31, 2016

(51) Int. Cl.
H04H 60/45      (2008.01)
H04N 21/458     (2011.01)
H04N 21/442     (2011.01)
G06N 5/04       (2006.01)
H04N 21/2668    (2011.01)
H04N 21/422     (2011.01)
H04N 21/466     (2011.01)

(52) U.S. Cl.
CPC ......... *H04N 21/44218* (2013.01); *G06N 5/047* (2013.01); *H04N 21/2668* (2013.01); *H04N 21/42207* (2013.01); *H04N 21/458* (2013.01); *H04N 21/4667* (2013.01)

(58) Field of Classification Search
CPC combination set(s) only.
See application file for complete search history.

(56) References Cited

PUBLICATIONS

Sato et al., Touché: Enhancing Touch Interaction on Humans, Screens, Liquids, and Everyday Objects, 10 pages, as accessed on Jun. 17, 2014.

*Primary Examiner* — Kieu Oanh T Bui

(57) ABSTRACT

In an exemplary method, a media service personalization system determines a first frequency response pattern based on frequency responses to a plurality of alternating current signal frequencies output to at least one external electrode of a remote control device, correlates the first frequency response pattern to a first personalized mode of operation, and directs a media service access device to operate in accordance with the first personalized mode of operation. In certain examples, the media service personalization system directs a frequency response determination facility of the remote control device to output the plurality of alternating current signal frequencies to the at least one external electrode of the remote control device and measure the frequency responses to the plurality of alternating current signal frequencies.

20 Claims, 13 Drawing Sheets

METHODS AND SYSTEMS FOR FACILITATING MEDIA SERVICE PERSONALIZATION BY WAY OF A CAPACITIVE SENSING REMOTE CONTROL DEVICE

BACKGROUND INFORMATION

A media service, such as a subscriber television service, provides end users of the service with access to media content. An end user typically interacts with the service by way of a media service access device to discover and access features of the media service and/or media content that is accessible through the media service.

A provider of a media service may want to personalize the media service to a specific end user in a manner that facilitates the user having a personalized experience with the media service. Such personalization can be challenging, however, when a media service access device shared by multiple users is used to access the media service. For example, a set-top box device may be shared by members of a household, making it difficult to determine which of the members of the household is using the set-top box device at a given time. The uncertainty about which user is currently interacting with the set-top box device has created difficulty for accurate personalization of the media service to a specific user.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION OF PREFERRED EMBODIMENTS

Methods and systems for facilitating media service personalization by way of a remote control device having a capacitive sensing electrode are described herein. For example, as will be described in more detail below, a media service personalization system may determine a first frequency response pattern based on frequency responses to a plurality of alternating current ("AC") signal frequencies output to at least one external electrode of a remote control device (e.g., a set-top box remote control device, a television remote control device, a universal remote control device, etc.). The media service personalization system may correlate the first frequency response pattern to a first personalized mode of operation. The media service personalization system may then direct a media service access device to operate in accordance with the first personalized mode of operation. For example, systems and methods described herein may direct the media service access device to operate in accordance with the first personalized mode of operation to personalize the media service to a specific user when the first frequency response pattern is associated with the user.

Systems and methods described herein may provide accurate and convenient selective personalization of a media service to an end user of the media service. Additional or alternative benefits that may be provided by one or more of the exemplary systems and methods described herein will be made apparent herein. Exemplary methods and systems for facilitating media service personalization by way of a remote control device having a capacitive sensing electrode will now be described in reference to the drawings.

Figure 1:
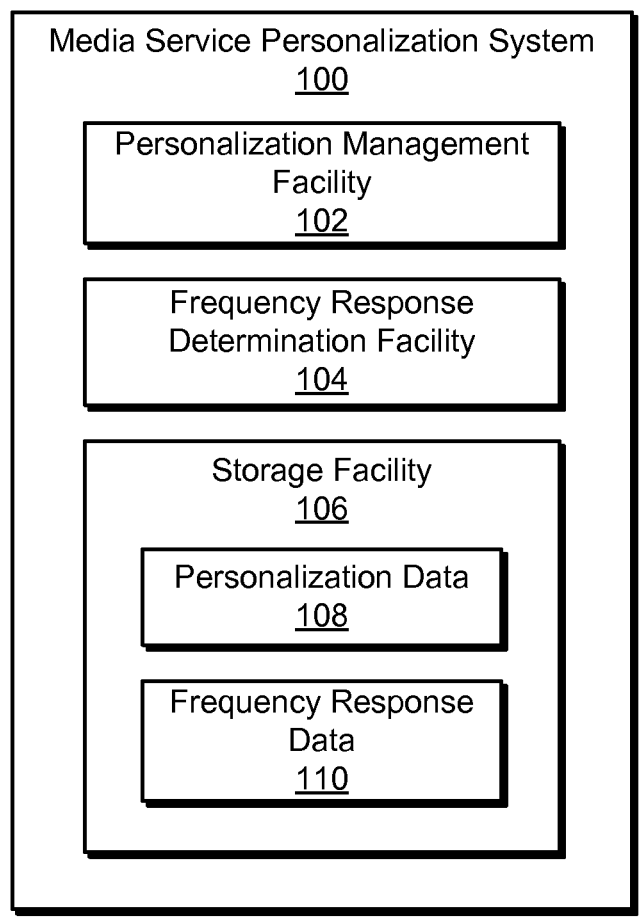
FIG. 1 illustrates an exemplary media service personalization system according to principles described herein.

FIG. 1 illustrates an exemplary media service personalization system 100 ("system 100"). System 100 may be configured to selectively personalize a media service to an end user of the media service, as described herein. As shown in FIG. 1, system 100 may include, without limitation, a personalization management facility 102 ("personalization facility 102"), a frequency response determination facility, and a storage facility 106 selectively and communicatively coupled to one another. Any suitable communication technologies may be employed to facilitate communications between facilities 102-106.

Although facilities 102-106 are shown to be separate facilities in FIG. 1, any of those facilities 102-106 may be combined into a single facility or split into additional facilities as may serve a particular implementation. Additionally or alternatively, storage facility 106 may be omitted from and external to system 100 in certain alternative implementations. Facilities 102-106 of system 100 may include or be otherwise implemented by one or more computing devices configured to perform one or more of the operations described herein. Facilities 102-106 will now be described in more detail.

Personalization facility 102 may determine when to personalize a media service to a specific user, group of users, and/or category of user based on receipt of a frequency response pattern that correlates to a stored personalized mode of operation. Personalization facility 102 may also refrain from personalizing the media service when a frequency response pattern does not correlate to a stored personalized mode of operation. Personalization facility 102 may make such determinations in any suitable way, including in any of the exemplary ways described herein. For example, personalization facility 102 may compare a frequency response pattern with one or more reference frequency response patterns associated with one or more personalized modes of operation.

Personalization facility 102 may perform one or more operations to facilitate personalization of the media service to a user, group of users, and/or category of users. For example, personalization facility 102 may direct a media service access device to operate in accordance with a personalized mode of operation. The media service access device may receive and respond to direction from personalization facility 102 by operating in accordance with the personalized mode of operation. When operating in accordance with the personalized mode of operation, the media service access device may personalize the media service to a specific user, group of users, and/or category of users. Examples of operations to personalize and refrain from personalizing the media service to one or more users and/or categories of users are described in more detail herein.

Personalization facility 102 may access and use personalization data to personalize the media service to one or more users and/or categories of users. The personalization data may represent any information that may be used to personalize the media service to one or more users, such as, for example, information about one or more users, such as user settings, user preferences, user demographics, previous user interactions with the media service (e.g., user history with the media service), and/or any other information related to the user(s). In some implementations, the personalization data may represent any information that may be used to personalize the media service to a specific category of user, such as user gender, user age range, and/or any other information related to the user category.

In certain examples, personalization facility 102 may maintain personalization data for a user, group of users, and/or category of users. As an example, personalization facility 102 may receive user personalization settings input by a user. As another example, personalization facility 102 may track interactions of a user with the media service and use the tracked interactions to generate and store personalization data. In certain implementations, personalization facility 102 may be configured to selectively track interactions of a user with the media service by way of a media service access device when the media service access device operates in accordance with a personalized mode of operation. Examples of such selective tracking are described in more detail herein.

Additionally, personalization facility 102 may store a new frequency response pattern and/or to selectively track interactions of a user with a media service when the new frequency response pattern is not determined to match a stored reference frequency response pattern. Personalization facility 102 may either correlate the new frequency response pattern to a user, group of users, and/or category of user or to store the new frequency response pattern as a reference frequency response pattern. For example, if a new frequency response pattern is determined not to match a stored reference frequency response pattern, personalization facility 102 may receive input from a user either correlating the new frequency response pattern to stored personalization settings for a user, group of users, and/or category of users or specifying personalization settings for a new user, group of users, and/or category of users.

Frequency response determination facility 104 may determine a frequency response pattern in response to a variable frequency AC sweep in which a plurality of AC signal frequencies are output to one or more external electrodes of a device configured to be physically held and/or operated by a user, such as a remote control device, a mobile device, (e.g., a tablet computer or a smartphone device), a portable entertainment device (e.g., a portable gaming or video device), exercise and/or recreation equipment (e.g., equipment having portion configured to be grasped by a user), a computing device input device (e.g., a mouse or touchpad), and/or any other device as may serve a particular implementation. Frequency response determination facility 104 may make such determinations in any suitable way, including in any of the exemplary ways described herein. For example, frequency response determination facility 104 may conduct a variable frequency AC sweep of a capacitive sensing electrode of a device to obtain a frequency response pattern. Frequency response determination facility 104 may initiate the variable frequency AC sweep when user interaction with the device is detected and/or in response to user input directing frequency response determination facility 104 to conduct the variable frequency AC sweep.

Storage facility 106 may store personalization data 108 accessed, generated, maintained, and/or used by personalization facility 102 and frequency response data 110 accessed, generated, maintained, and/or used by frequency response determination facility 104. The personalization data 108 may represent personalization information for one or more end users of a media service and/or one or more categories of end user. In certain examples, the personalization data 108 may include individual and/or group user profiles for end users of the media service.

The frequency response data 110 may represent frequency response information that is correlated to end users of a media service, categories of end user, and/or individual and/or group user profiles for end users of the media service. In some implementations, the frequency response data 110 may represent frequency response information that is not correlated to any users. Storage facility 104 may maintain additional or alternative data as may serve a particular implementation.

Figure 2:
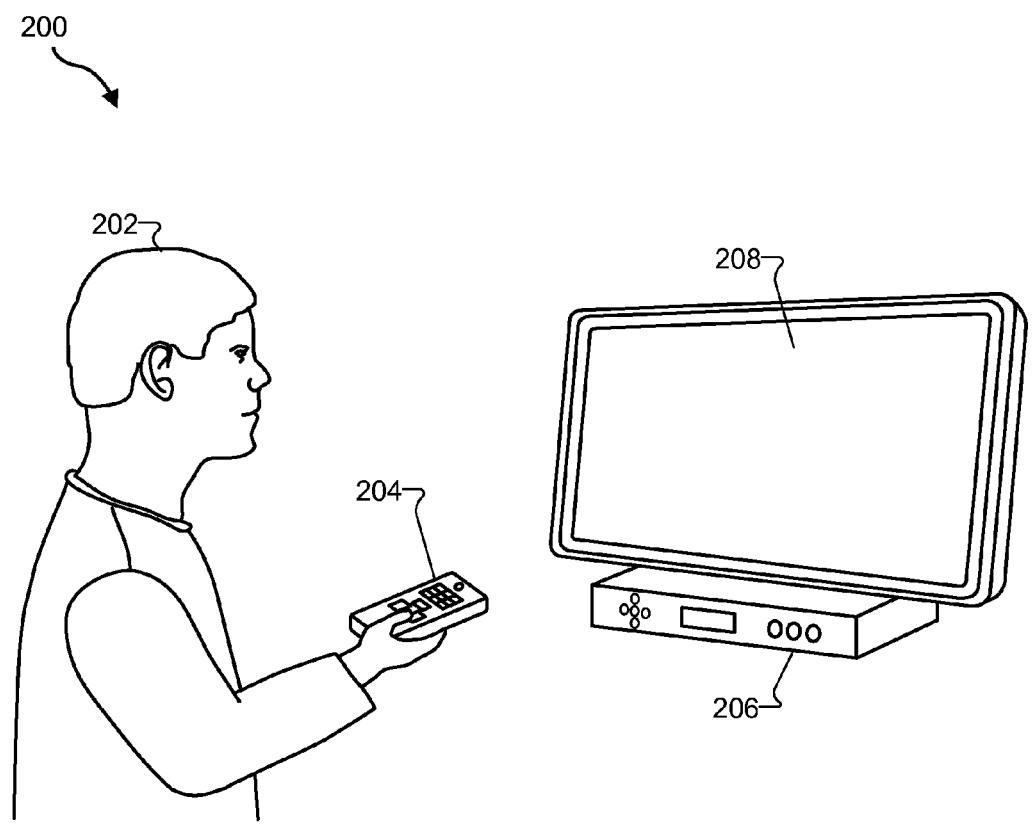
FIG. 2 shows an exemplary implementation in which a user is using a remote control device to interact with a media service access device according to principles described herein.

Frequency response determination facility 104 may conduct a variable frequency AC sweep of a capacitive sensing electrode of a device held and/or operated by a user to obtain a frequency response pattern associated with the user. To illustrate, FIG. 2 shows an exemplary implementation 200 of system 100 in which a user 202 is holding and operating a remote control device 204 for controlling operation of a media service access device 206. Media service access device 206 may be connected to a display screen 208 (e.g., a television screen or computer monitor). While FIG. 2 shows media service access device 206 and display screen 208 as separate devices, it will be recognized that in some examples, media service access device 206 and display screen 208 may be integrated into a single device.

In some implementations, media service access device 206 may be configured to access a media service, as will be described in more detail below. Media service access device 206 may include any suitable user computing device, such as a set-top box device, gaming console, or other shared computing device, that is configured to access a media service, such as a media service that is actually, typically, or predictably shared by multiple users under normal use conditions for the device. Additionally or alternatively, media service access device 206 may include any other suitable device that maintains and/or accesses profiles and/or utilizes personalized modes of operation associated with users, groups of users, and/or categories of users.

In some implementations, media service access device 206 may be located at a customer premises (e.g., a house or other premises associated with an end user of media service access device 206). Accordingly, media service access device 206 may be actually, typically, or predictably shared by any members of a household who reside within the customer premises and/or other people who visit the customer premises.

A person located within the customer premises may utilize a shared user input device, such as remote control device 204 and/or any other suitable user input device as described herein, to provide user input to interact with media service access device 206. Remote control device 204 may be any device that may be actually, typically, or predictably shared by multiple users to interact with media service access device 206. Remote control device 204 may be configured to receive user input from a user and wirelessly transmit signals to media service access device 206 using any suitable transmission and/or signaling technologies (e.g., infrared and/or radio frequency signals). For instance, remote control device 204 may be a consumer electronics remote control device, such as a set-top box remote control device, a television remote control device, or a universal remote control device as may serve a particular implementation. Components of system 100 may be implemented entirely by remote control device 204 or may be distributed across remote control device 204 and media service access device 206.

The remote control device 204 shown in FIG. 2 will now be described.

Figure 3:
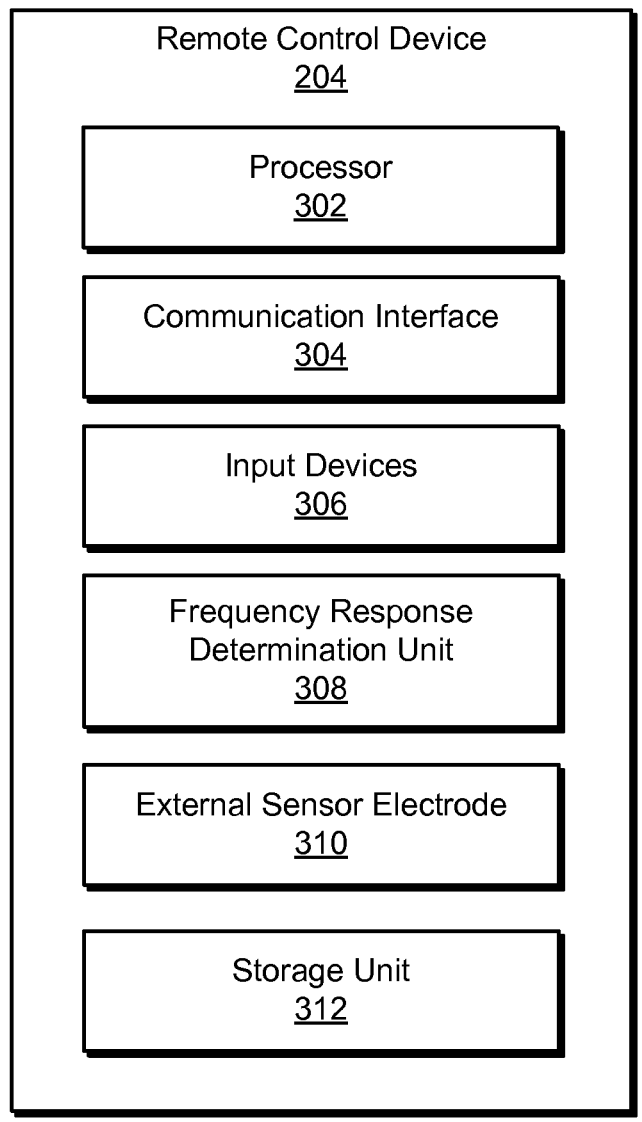
FIG. 3 illustrates exemplary components of a remote control device according to principles described herein.

FIG. 3 illustrates exemplary components of remote control device 204. As shown, remote control device 204 may include a processor 302, a communication interface 304, input components 306, a frequency response determination unit 308, an external sensor electrode 310, and a storage unit 312. Remote control device 204 may include additional or alternative components as may serve a particular implementation. In certain implementations, one or more of processor 302, communication interface 304, frequency response determination unit 308, and storage unit 312 may be included in an integrated circuit, such as, for example, a system on chip ("SOC") circuit.

Processor 302 may include one or more processors configured to perform one or more of the operations described herein. For example, processor 302 may execute one or more applications (e.g., a personalization management application or a frequency response determination application) stored within storage unit 312, process input received by way of communication interface 304, input components 306, and/or external sensor electrode 310, and/or direct frequency response determination unit 308 to conduct a variable frequency AC sweep of external sensor electrode 310 to obtain a frequency response pattern associated with a user.

Communication interface 304 may be configured to facilitate communication of remote control device 204 with one or more other devices. Examples of communication interface 304 include, for example, a wireless interface for communicating with media service access device 206 and/or one or more other devices via transmission and/or signaling technologies (e.g., infrared and/or radio frequency signals).

Input components 306 may include any device or combination of devices that facilitate input provided by a user. For example, input components 306 may include a touchscreen or touchpad configured to facilitate input by a user of one or more gestures, one or more buttons configured to facilitate selection by a user of one or more options, one or more sensors (e.g., accelerometers) that track user movement and/or physical orientation of remote control device 204, a microphone configured to facilitate input of one or more voice commands spoken by a user, and/or any other type of input device as may serve a particular implementation.

Frequency response determination unit 308 may include any device or combination of devices for generating a signal and/or receiving a frequency response. Frequency response determination unit 308 may include, for example, an integrated circuit and/or a combination of circuits for generating, transmitting, and receiving signals for performing a variable frequency signal sweep that is useful in obtaining a frequency response pattern when applied to external sensor electrode 310. For example, frequency response determination unit 308 may generate and output an AC signal that varies in frequency over time. Additionally, frequency response determination unit 308 may receive an AC or DC signal representative of a frequency response pattern.

Frequency response determination unit 308 may include capabilities for converting digital information to analog signals for outputting an AC signal. For example, frequency response determination unit 308 may include a digital control that directs an analog wave generator to generate and output an AC signal. Additionally, frequency response determination unit 308 may include capabilities for converting received analog signals to digital information for determination and analysis of a frequency response signal by processor 302. For example, frequency response determination unit 308 may include an analog-to-digital converter ("ADC") that receives and converts an analog signal, such as an AC or direct current ("DC") signal, into digital information that may be processed by processor 302. In some implementations, frequency response determination unit may further include capabilities for converting an AC signal to a DC signal, such as a time-varying DC signal, for envelope detection of the response signal prior to conversion to digital information. In additional implementations, frequency response determination unit may convert a received AC signal to digital information without envelope detection of the AC signal.

Frequency response determination unit 308 may include any other components useful for generating a signal and/or determining a frequency response. For example, frequency response determination unit 308 may include one or more filters, such as high-pass filters and/or low-pass filters. In some implementations, such filters may remove noise and/or irrelevant elements from AC signals such as by filtering out environmental and/or background noise components and certain undesired high frequency components. In at least one implementation, frequency determination unit 308 may direct a variable frequency AC signal through a high-pass filter and/or a low pass filter prior to amplifying the variable frequency AC signal for transmission to a sensor electrode.

External sensor electrode 310 may function as a capacitive sensing electrode for measuring variable frequency responses correlated to a user contacting external sensor electrode 310. External sensor electrode 310 may include any electrically conductive layer, such as any suitable metallic and/or semi-metallic layer. For example, external sensor electrode 310 may include a metallic or semi-metallic electrode body and/or coating (e.g., paint layer) having any suitable degree of electrical conductivity. External sensor electrode 310 may be exposed to an exterior of remote control device 204 such that a user contacts at least a portion of external sensor electrode 310 while using remote control device 204. For example, external sensor electrode 310 may comprise a layer and/or coating disposed on at least a portion of remote control device 204 configured to be grasped by a user while holding and/or otherwise operating remote control device 204. External sensor electrode 310 may be electrically connected to frequency response determination unit 308 so as to receive a frequency sweep AC signal output from frequency response determination unit 308 and return an AC response signal to frequency response determination unit 308. In some implementations, external sensor electrode 310 may comprise a plurality of separate external sensor electrodes disposed on exterior portions of remote control device 204. External sensor electrode 310 may be formed to any suitable shape and/or configuration, without limitation.

Storage unit 312 may store any type of data as may serve a particular implementation. For example, storage unit 312 may store data representative of one or more applications (e.g., a personalization management application or a frequency response determination application) that may be executed by remote control device 204. Interrelationships between the various components of remote control device 204 shown in FIG. 3 will now be described.

Figure 4:
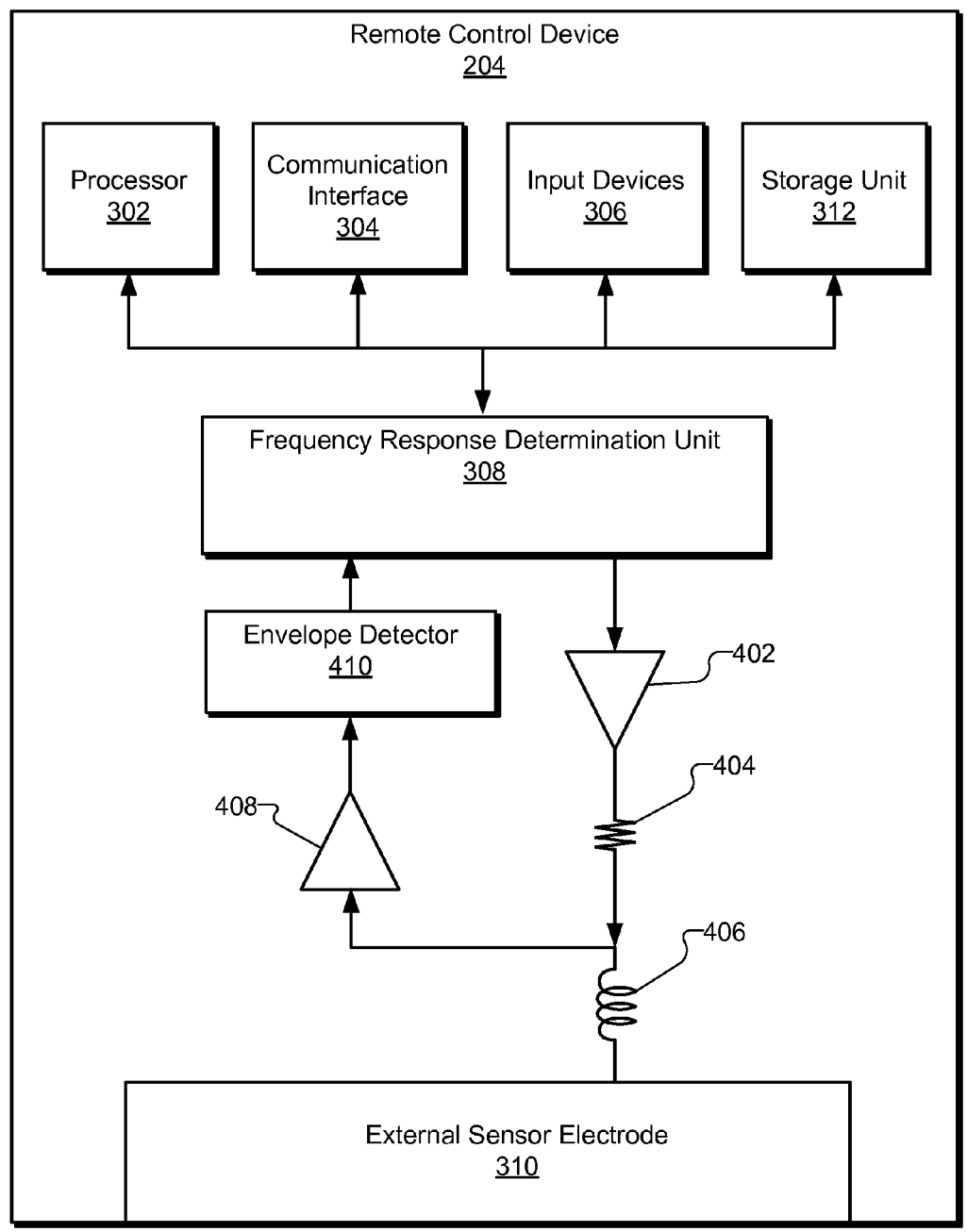
FIG. 4 illustrates exemplary components of a remote control device and their interrelationships according to principles described herein.

FIG. 4 illustrates exemplary components of remote control device 204 and their interrelationships. As shown, processor 302, communication interface 304, input components 306, and/or storage unit 312 may be coupled to each other and/or to frequency response determination unit 308. Remote control device 204 may include additional or alternative components as may serve a particular implementation. For example, as shown, remote control device 204 may include additional components for conveying and/or processing a variable frequency AC signal output from frequency response determination unit 308 and a response signal returned from external sensor electrode 310.

In some implementations, remote control device 204 may include an amplifier 402 for amplifying a frequency sweep AC signal output from frequency response determination unit 308. Remote control device 204 may further include a resister 404 and an inductor 406 disposed between amplifier 402 and external sensor electrode 310. Inductor 406 may include a large bias inductor that facilitates detection of variations in capacitance of a user contacting external sensor electrode 310. Remote control device 204 may additionally include an isolating buffer amplifier 408 to isolate and amplify a response AC signal from external sensor electrode 310.

Further, remote control device 204 may include an envelope detector 410 between isolating buffer amplifier 408 and frequency response determination unit 308. Envelope detector 410 may envelop a response AC signal that has been returned from external sensor electrode 310 and amplified by isolating buffer amplifier 408. Envelope detector 410 may, for example, envelop the response AC signal by converting the response AC signal to a time-varying DC signal. The time-varying DC signal (i.e., the enveloped signal) may provide a clear representation of changes in the response AC signal in comparison with the variable frequency AC signal output from frequency response determination unit 308. Enveloping the response AC signal by converting it to a time-varying DC signal may reduce the amount of storage space required to store and analyze data associated with the response AC signal. Following enveloping of the response AC signal by envelope detector 410, the time-varying DC signal produced by envelope detector 410 may be received by frequency response determination unit 308.

A variable frequency AC signal output by frequency response determination unit 308 may comprise an AC signal having a plurality of different frequencies for performing a variable frequency AC sweep. For example, a variable frequency AC signal may vary over a range of different frequencies during a specified time period.

Figure 5:
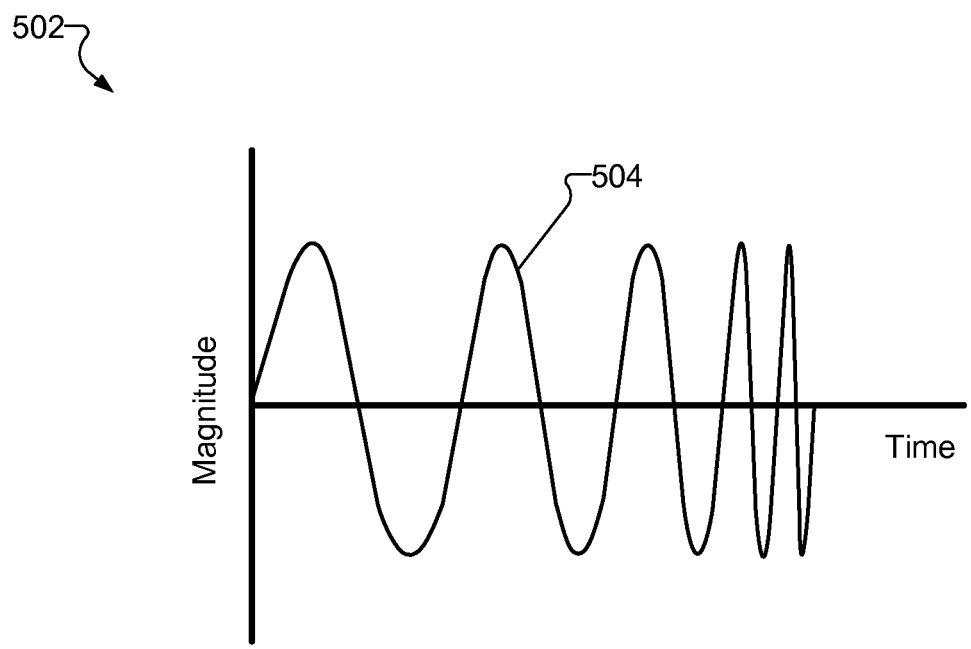
FIG. 5 illustrates an exemplary graph of a variable frequency alternating current sweep waveform generated by a frequency response determination unit of a remote control device according to principles described herein.

FIG. 5 illustrates an exemplary graph 502 of a variable frequency AC sweep waveform ("sweep waveform") 504 corresponding to a variable frequency AC sweep signal generated by frequency response determination unit 308 of a remote control device 204. Graph 502 shows sweep waveform 504 plotted along a time axis, with the amplitudes of sweep waveform 504 being represented by distances of sweep waveform 504 from the time axis in the direction of the magnitude axis perpendicular to the time axis.

Sweep waveform 504 may have an amplitude and/or phase that is specified by processor 302 and/or frequency response determination unit 308. Additionally, sweep waveform 504 may vary in frequency over time in a manner specified by processor 302 and/or frequency response determination unit 308. A variable frequency AC signal output by frequency response determination unit 308 in accordance with sweep waveform 504 may enable measurements of responses from external sensor electrode 310 at a plurality of different AC signal frequencies. Response AC signals received from external sensor electrode 310 may differ from user to user. As will be described in greater detail below, a wavelength pattern corresponding to a frequency response signal received from external sensor electrode 310 may be referred to herein as a "frequency response pattern." A frequency response pattern may correspond to a response AC signal received from external sensor electrode 310 or to a time-varying DC signal derived from a response AC signal by, for example, enveloping the response AC signal at envelope detector 410.

Figure 6:
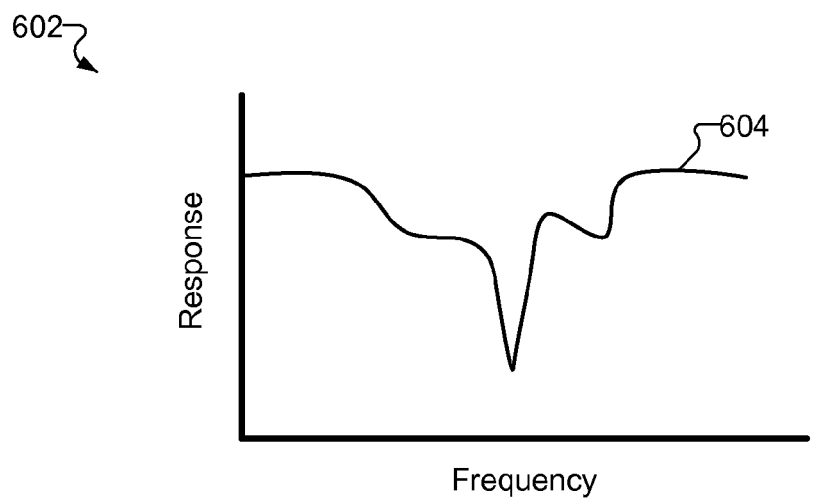
FIG. 6 illustrates exemplary graphs of frequency response patterns corresponding to different users of a media service access device according to principles described herein.
Figure 6:
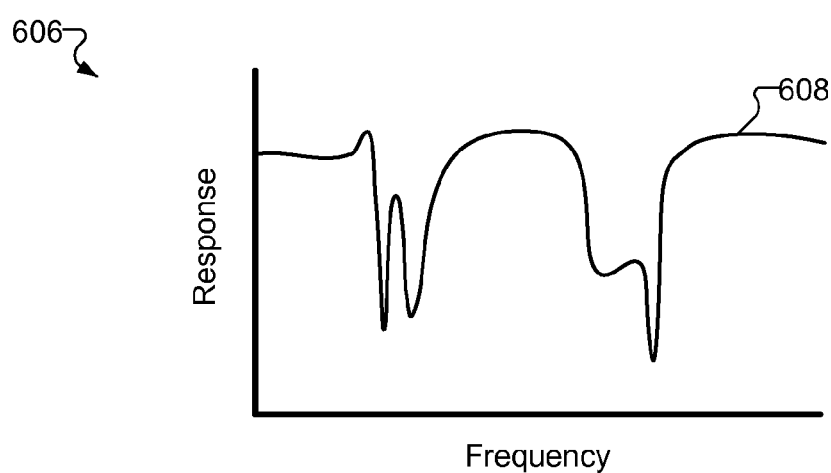

FIG. 6 illustrates exemplary graphs of frequency response patterns corresponding to different users of a hand-held device, such as remote control device 204. For example, graph 602 includes a frequency response pattern 604 (i.e., frequency response signature or curve) corresponding to a first user and graph 606 includes a frequency response pattern 608 corresponding to a second user. As shown in FIG. 6, frequency response patterns 604 and 608 may be plotted along a frequency axis, with various response magnitudes being illustrated in the direction of the response axis at each of the different frequencies. In some examples, response magnitudes for a frequency response pattern may correlate to amplitudes of a corresponding response AC signal. As shown, frequency response patterns 604 and 608, which are each correlated to different users, may differ from each other. For example, frequency response patterns 604 and 608 may differ from each other in response magnitudes at various frequencies. Frequency response patterns 604 and 608 may each be obtained in response to AC signals having a specified amplitude and/or range of frequencies during a specified time. For example, frequency response patterns 604 and 608 may each be obtained in response to AC signals output by frequency response determination unit 308 and having substantially the same waveform (e.g., sweep waveform 504).

Frequency response patterns 604 and 608 may represent time-varying DC signals derived from response AC signals and received by frequency response determination unit 308, where the time-varying DC signals are converted to digital information. Alternatively, in some implementations, response AC signals may be received by frequency response determination unit 308 and converted to digital information, and the digital information corresponding to the received response AC signals may subsequently be converted by processor 302 and/or frequency response determination unit 308 into data representative of frequency response curves, such as frequency response patterns 604 and 608. In additional implementations, frequency response patterns corresponding to different users may include data (e.g., waveform data) representing response AC signals that are not enveloped. Data corresponding to frequency response patterns 604 and 608 may include fewer data points than data corresponding to response AC signals. Any other suitable type of frequency response data corresponding to various users may be obtained and/or analyzed according to the implementations described herein, without limitation.

Frequency response patterns 604 and 608 may each have response magnitudes that vary over a range of frequencies. For example, an AC signal corresponding to sweep waveform 504 may be output from frequency response determination unit 308, and a frequency response pattern 604 or 608 correlated to a response AC signal may be determined in response. The different response magnitudes may be directly correlated to differences in amplitude and/or phase shift of a corresponding response AC signal at different frequencies. For example, a portion of a response AC signal having a smaller amplitude may correlate to a portion of a corresponding frequency response pattern having a smaller magnitude. The differences in amplitude and phase of a response AC signal may be due to a variety of factors related to a user's bodily composition and/or to how the user contacts an exposed sensor electrode, such as external sensor electrode 310, of remote control device 204.

Differences in wave amplitude and/or phase of a response AC signal in comparison with a frequency sweep AC signal output by frequency response determination unit 308 may be due to a variety of factors or combinations of factors. A response AC signal received from external sensor electrode 310 may experience different amounts of deviation from the frequency sweep AC signal at different frequencies because, at the different frequencies, the frequency sweep AC signal applied to external sensor electrode 310 will flow differently through the body of a user contacting external sensor electrode 310 at each of the different frequencies. For example, a user's body may have different electrical properties (e.g., capacitance, resistance, etc.) at different AC signal frequencies, thereby causing the AC signal to flow differently through the user's body at each of the different AC signal frequencies. Different tissue groups in the user's body (e.g., bone tissue, muscle tissue, fatty tissue, etc.) may be more or less resistant to the flow of an AC signal at different frequencies, resulting in different flow of the AC signal through the user's body at the different frequencies.

Additionally, frequency response patterns corresponding to response AC signals received from external sensor electrode 310 may vary based on how a user contacts external sensor electrode 310 and/or otherwise holds remote control device 204. For example, a frequency response pattern corresponding to a response AC signal may vary in accordance with an amount of surface area of a user contacting external sensor electrode 310. The frequency response pattern may also vary in accordance with the number of portions of a user's hand that are contacting external sensor electrode 310 and/or in accordance with which portions of the user's hand are contacting external sensor electrode 310. A user may, for example, grasp remote control device 204 in a variety of different manners such that different response AC signals are produced. Response AC signals may also vary based on whether or not the external sensor electrode 310 is contacted at all. Accordingly, external sensor electrode 310 may be utilized to determine whether or not remote control device 204 is being held, even before a user interacts with remote control device 204 by pushing a button.

Figure 7:
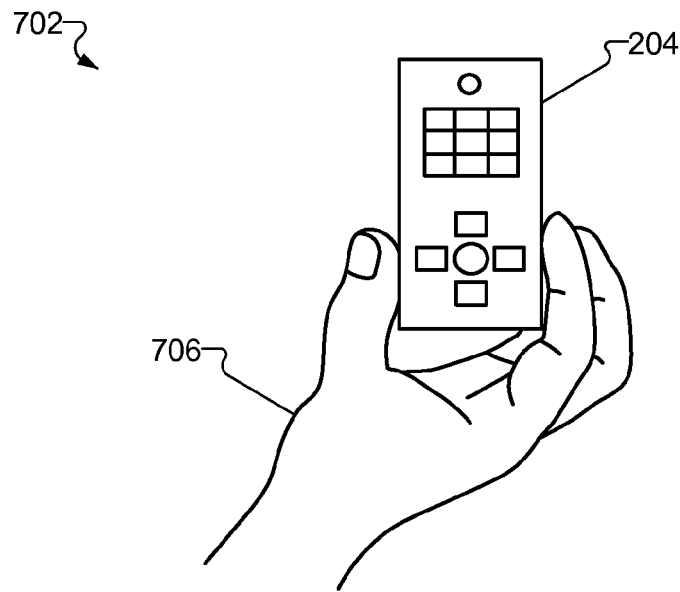
FIG. 7 illustrates exemplary scenarios in which different users hold a remote control device according to principles described herein.
Figure 7:
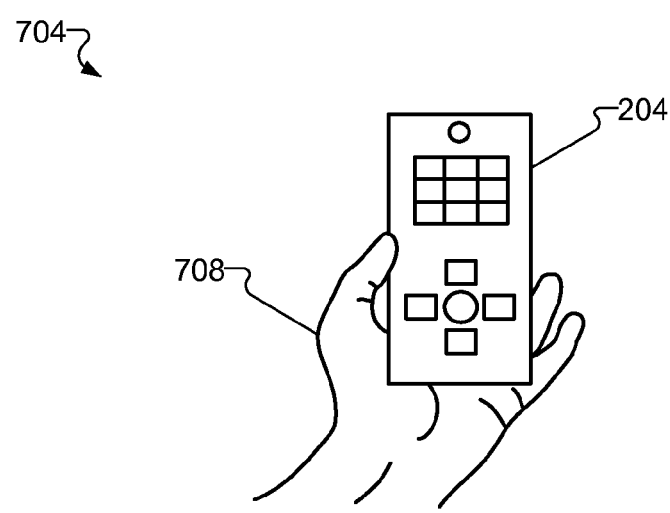

FIG. 7 illustrates exemplary scenarios 702 and 704 in which different users hold a remote control device 204 in different manners. As illustrated in scenario 702, for example, a first user 706 may hold remote control device 204 in a first manner with a first grip. Additionally, in scenario 704, a second user 708 may hold remote control device 204 in a second manner with a second grip. In some implementations, a single user may also hold remote control device 204 in a plurality of different manners.

In order to identify a user of remote control device 204, a reference frequency response pattern associated with the user may be determined and stored. For example, a reference frequency response pattern for a user may be stored in storage unit 312 of remote control device 204 or in a storage location external to remote control device 204 (e.g., at media service access device 206, an identity management server, etc.).

A reference frequency response pattern for a user may be measured during a learning phase during which a variable frequency AC sweep is performed by remote control device 204 to measure frequency response patterns while the user is holding remote control device 204 at one or more points in time. When frequency response patterns for the user are measured at a plurality of points in time, the multiple measurements for each frequency response pattern may be averaged and/or otherwise combined to produce a single reference frequency response pattern. A reference frequency response pattern for a user 202 may be generated by remote control device 204. Alternatively, a reference frequency response pattern for a user may be generated and/or stored by another computing device and transferred to remote control device 204. For example, remote control device 204 may be connected to another computing device and/or server via a network. Additionally, during a learning phase, user interactions with remote control device 204 and/or media service access device 206 may be tracked in order to determine one or more user preferences to be associated with a profile of the user and/or a personalized mode of operation associated with the user.

In some implementations, a plurality of reference frequency response patterns may be associated with a single user. For example, a plurality of frequency response patterns may be detected for a user due to the user holding remote control device 204 in different manners (e.g., holding the remote control with different grips or with different hands, etc.). Alternatively, different frequency response patterns may be detected for the user depending on whether or not the user is wearing footwear or other clothing items while holding mode control device 204, since footwear and/or other clothing items may alter the capacitance of the user at various frequencies.

Reference frequency response patterns corresponding to response AC signals may be correlated to specific users. For example, returning to FIG. 6, frequency response pattern 604 may be correlated to a specific user, such as a user that is determined to regularly use remote control device 204. While the user is holding remote control device 204, frequency response determination unit 308 may output a variable frequency AC signal, such as an AC signal corresponding to sweep waveform 504, to external sensor electrode 310. A frequency response pattern 604 may then be determined based on a response AC signal received from external sensor electrode 310. Frequency response pattern 604 may then be compared with one or more reference frequency response patterns stored in storage unit 312 and/or stored at a location external to remote control device 204 (e.g., media service access device 206) to determine whether frequency response pattern 604 matches one of the stored reference frequency response patterns to at least a threshold degree of certainty. Various criteria may be defined within processor 302 for determining whether a frequency response pattern matches a reference frequency response pattern. In some embodiments, remote control device 204 and/or media service access device 206 may allow for the threshold to be established by an authorized user. For example, where added security is desired, a higher degree of certainty may be required in order to meet the selected threshold for determining that a frequency response pattern matches a reference frequency response pattern.

In additional implementations, remote control device 204 and/or media service access device 206 may determine whether a frequency response pattern of a user matches a reference frequency response pattern for purposes of allowing the user to access selected portions of data on media service access device 206. For example, a user may be permitted to access some portions of data on media service access device 206 while being excluded from accessing other portions of data without first determining whether a frequency response pattern corresponding to the user matches a reference frequency response pattern. For example, the user may only access certain applications and/or profiles on media service access device 206 without first determining that the user has a frequency response pattern matching a reference frequency response pattern corresponding to a user permitted to access such applications and/or profiles. In some examples, a plurality of reference frequency response patterns may be stored on remote control device 204 and/or media service access device 206, with each of the plurality of reference frequency response patterns being associated with a different user having a different profile. The different profiles may each have different access privileges defining which applications, data, and/or write privileges are available to a user associated with the profile.

Alternatively, the different profiles may specify how content is organized and presented to different users associated with the profiles in accordance with personal modes of operation specific to each of the different users. For example, media service access device 206 may be configured to display selected content in a specified manner that is personalized to a user determined to be using remote control device 204. Media service access device 206 may, for example, operate in accordance with the personal mode of operation specific to the user of remote control device 204. While operating in a personal mode of operation specific to a user, media service access device 206 may, for example, provide a personalized GUI view on display screen 208 listing shows and/or content specific to the user and/or may otherwise organize a GUI or display view on display screen 208 in accordance with user preferences.

If a frequency response pattern associated with a user of remote control device 204 does not match a stored reference frequency response pattern to at least the threshold degree of certainty, remote control device 204 may perform additional variable frequency AC sweeps of external sensor electrode 310, particularly if the initial frequency response pattern is close to, but not within, the threshold degree of certainty. If, after the initial and/or subsequent variable frequency AC sweeps, the frequency response pattern associated with the user is determined to not match a stored reference frequency response pattern, the frequency response pattern may be associated with a new user identifier. An authorized individual, such as an administrator, may determine a level of access and/or may establish a new profile for a user associated with the new user identifier upon determining who the user is. In some instances, media service access device 206 may be configured to display content on display screen 208 in a manner that is not personalized to a user of remote control device 204.

In some implementations, a user may be prevented from accessing data on media service access device 206 if a variable frequency AC sweep of external sensor electrode 310 results in a frequency response pattern for the user that does not match a stored reference frequency response pattern. Alternatively, the user may be prevented from accessing certain portions of data (e.g., certain applications, programming, etc.) stored on media service access device 206, and/or the user may be logged into media service access device 206 under a general profile that is not associated with a known user. Additionally, remote control device 204 and/or media service access device 206 may initiate a security action in response to a determination that the frequency response pattern of the user does not match a stored reference frequency response pattern. For example, media service access device 206 may notify an administrator or other user associated with a reference frequency response pattern of a failed attempt to access media service access device 206 and/or media service access device 206 may prevent further access attempts prior to being unlocked by an administrator.

In some implementations, reference frequency response patterns may be correlated to certain groups and/or categories of users in addition to or instead of being correlated to a specific user. For example, certain types of users may exhibit common frequency response pattern characteristics. Children may, for example, exhibit readily identifiable frequency response characteristics that are different from an adult. For example, a child's hands may contact a smaller surface area of external sensor electrode 310 than an adult's hands while holding remote control device 204. Additionally, volumes, proportions, and/or densities of bodily tissues of a child may differ predictably from those of an adult. Such differences may be readily identifiable in a measured frequency response pattern. Also, male and female users may generally exhibit differences, such as, for example, differences in volumes, proportions and/or densities of bodily tissues, and/or differences in hand size and/or shape that results in differences in measured frequency response patterns.

Profiles associated with the specified groups and/or categories of users may specify how content is organized and/or presented to the different groups and/or categories of users in accordance with group modes of operation specific to each of the different groups and/or categories of users. For example, media service access device 206 may be configured to display selected content in a specified manner that is directed to a user that is determined to be a child based on a frequency response pattern obtained by remote control device 204. A GUI displayed on display screen 208 by media service access device 206 may, for example, show television channels, television shows, and/or other media content that is geared towards children. Additionally, media service access device 206 may limit and/or prevent access to content geared towards an adult audience. For example, media service access device may prevent access to content exceeding a particular age rating without prior authorization from an adult user.

Frequency response patterns determined in response to variable frequency AC sweeps by remote control device 204 may additionally be used to determine user gestures corresponding to specific actions to be carried out by remote control device 204 and/or media service access device 206. For example, different frequency response patterns may correspond to different manners in which a user holds remote control device 204, enabling the user to hold the remote in a manner indicative of a gesture for purposes of carrying out an action associated with the gesture. Some user profiles may, for example, be associated with multiple different frequency response patterns for a user. Each of the different frequency response patterns may correspond to a different action specified by the user. For example, the user may change his or her grip by holding remote control device 204 differently and/or by lifting one or more fingers from remote control device 204 in order to specify a desired action by remote control device 204 (e.g., pause, play, stop, increase or decrease volume, change channel, bring up menu, etc.).

In order to identify a gesture by a user of remote control device 204, a reference frequency response pattern associated with the gesture may be determined and stored. For example, a reference frequency response pattern for a user gesture may be stored in storage unit 312 of remote control device 204 or in a storage location external to remote control device 204 (e.g., media service access device 206, an identity management server, etc.). A reference frequency response pattern for a user may be measured during a learning phase during which one or more variable frequency AC sweeps are performed in order to determine frequency response patterns while the user is holding remote control device 204 in accordance with the gesture. In some examples, during the learning phase, the user may be prompted to identify whether the determined frequency response patterns correspond to a profile associated with the user and/or to a specific gesture.

Media service access device 206 may be connected to a media service provider system, as will now be described.

Figure 8:
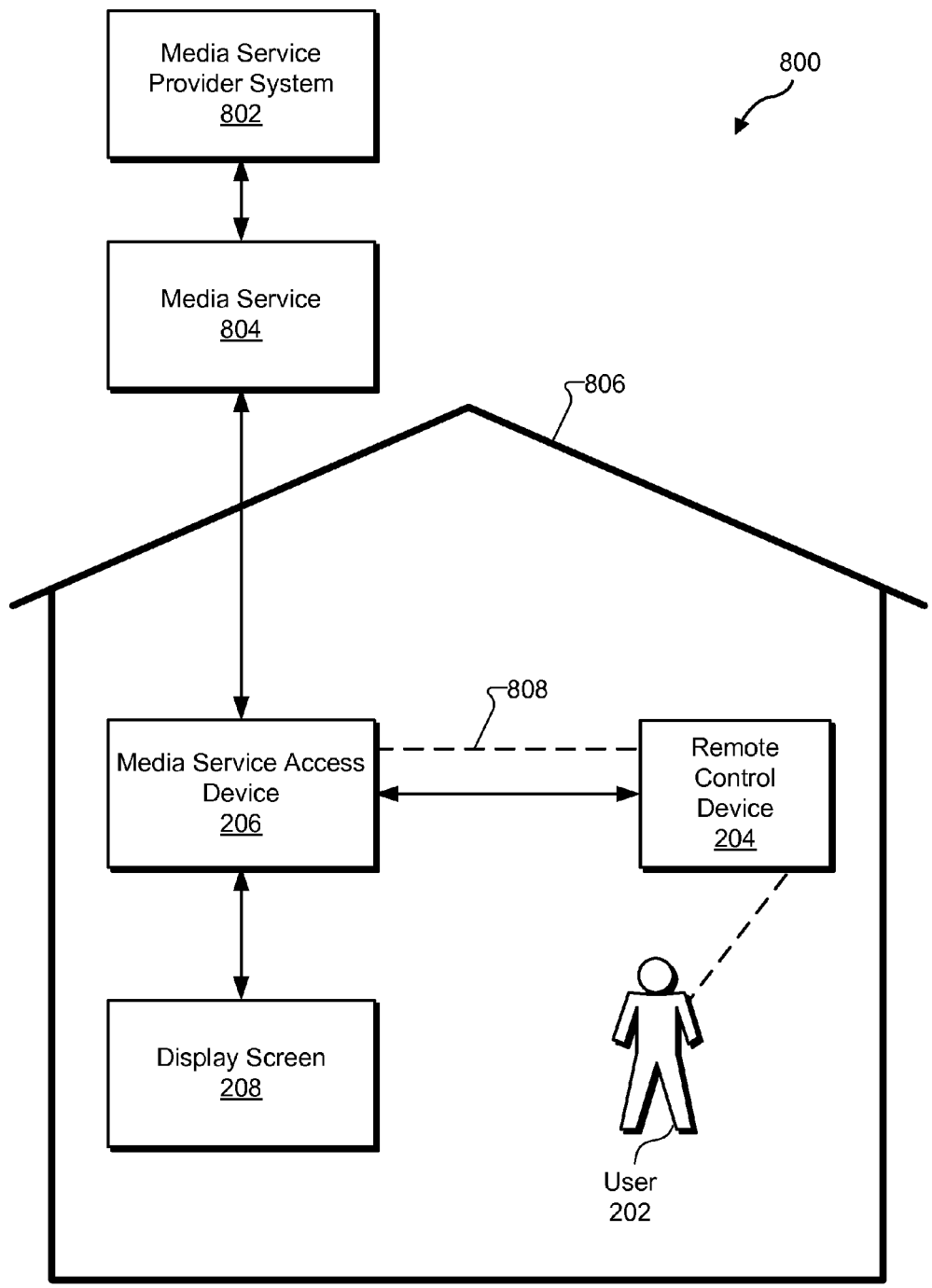
FIG. 8 illustrates an exemplary implementation of a media service personalization system according to principles described herein

FIG. 8 illustrates an exemplary implementation 800 in which media service access device 206 is connected to a media service provider system 802 configured to provide a media service 804. Media service provider system 802 may include one or more computing devices (e.g., server computing devices) associated with (e.g., operated by) a provider of media service 804 and configured to provide media service 804 for access by one or more end users of media service 804.

Media service 804 may include any service by way of which an end user of the service may discover, access, and/or consume media content and/or information about media content. For example, media service 804 may include a television programming service (e.g., a subscriber television service), an on-demand media service (a video-on-demand service), a video distribution service, and/or any other service that distributes media content and/or media content information to a user.

As used herein, the term "media content" may refer to any form of media that may be distributed by way of a media service (e.g., media service 804) and consumed by an end user of the media service. Media content may include discrete instances of media, which may be referred to as media programs. The term "media program" may refer to any television program, on-demand media program, pay-per-view media program, broadcast media program (e.g., broadcast television program), multicast media program (e.g., multicast television program), narrowcast media program (e.g., narrowcast video-on-demand program), IPTV media program, advertisement, video, movie, audio program, radio program, or any other media program that a user may access by way of the media service. Additionally or alternatively, media service access device 206 may include any other suitable device that maintains and/or accesses profiles and/or utilizes personalized modes of operation associated with users, groups of users, and/or categories of users.

Media service 804, including media content, information, features, and/or media service user interfaces of the media service, may be accessible to an end user of media service 804 by way of one or more appropriately configured user computing devices, such as media service access device 206.

A particular user computing device may be shared between multiple users. A shared user computing device may be a device that is actually, typically, or predictably shared by multiple users under normal use conditions for the device. For example, a shared media service access device may be used, in turn or concurrently, by any users in a group of multiple users. To illustrate, a set-top box device may be shared by members of a household to access media service 804.

Another particular user computing device may be a personal user device. A personal user device may be a device that is actually, typically, or predictably used exclusively or predominantly by a single particular user. Accordingly, the personal user device may be said to be specific to the user. To illustrate, a mobile device (e.g., a mobile phone, a tablet, a wearable device, etc.) may be used exclusively or predominantly by a particular user. In certain examples, such a personal user device may be configured to access media service 804 and may be referred to as a personal media service access device. In other examples, a personal user device may not be configured to access the media service.

In implementation 800, media service access device 206 is configured to access media service 804. Media service access device 206 may include any user computing device, such as a set-top box device, that is configured to access the media service 804 and that is actually, typically, or predictably shared by multiple users under normal use conditions for the device.

As shown in FIG. 8, media service access device 206 may be located at a customer premises 806 (e.g., a house or other premises associated with an end user of media service 804). Accordingly, media service access device 206 may be actually, typically, or predictably shared by any members of a household who reside within customer premises 806 and/or other people who visit customer premises 806.

A person located within customer premises 806 may utilize a shared user input device, such as remote control device 204, to provide user input to interact with media service access device 206. Remote control device 204 may be actually, typically, or predictably shared by multiple users to interact with media service access device 206. As an example, remote control device 204 may be configured to receive user input from a user and wirelessly transmit signals to media service access device 206 using any suitable transmission and/or signaling technologies (e.g., infrared and/or radio frequency signals). For instance, remote control device 204 may be a consumer electronics remote control device, such as a television remote control device.

When user input to interact with media service access device 206 is received by way of remote control device 204, personalization facility 102 may direct media service access device 206 to operate in a shared mode of operation to refrain from personalizing media service 804 to a specific user. Additionally, personalization facility 102 may direct media service access device 206 to operate in a personal mode of operation to personalize media service 804 to a specific user when a specific user, group of users, and/or category of user is determined in accordance with any of the methodologies described herein. For example, remote control device 204 may perform a variable frequency AC sweep to determine that a particular user is holding remote control device 204, and media service access device 206 may operate in a personal mode of operation associated with a user profile of the particular user.

Personalization facility 102 may determine whether a remote control session between a media service access device 206 and remote control device 204 is active or inactive and, based on the status of the remote control session, determine whether to personalize or to refrain from personalizing the media service to the user. To this end, personalization facility 102 may identify a start and/or an end of a remote control session between remote control device 204 and media service access device 206.

A remote control session may be defined to start as may suit a particular implementation. For example, one or more events may be predefined to indicate a start of a remote control session. Examples of events that may be defined to indicate a start of a remote control session may include, without limitation, an establishment of a communication connection between remote control device 204 and media service access device 206, communications between remote control device 204 and media service access device 206 to establish a communication connection and/or a remote control session, a transmission of a remote control command from remote control device 204 to media service access device 206, receipt by remote control device 204 of user input to interact with media service access device 206, and/or any combination or sub-combination of such events.

A remote control session may be defined to end as may suit a particular implementation. For example, one or more events may be predefined to indicate an end of a remote control session. Examples of events that may be defined to indicate an end of a remote control session may include, without limitation, a session timeout (e.g., an expiration of the remote control session based on a lack of user interaction with media service access device 206 by way of remote control device 204 for a predefined length of time), a request transmitted from remote control device 204 to media service access device 206 to end a remote control session, a start of a remote control session between media service access device 206 and remote control device 204 in accordance with another personal mode of operation associated with another user, group of users, and/or category of users, receipt of user input to interact with shared media service access device 206 by way of another user input device such as another remote control device or user computing device (e.g., personal computer, mobile computing device, etc.), and/or any combination or sub-combination of such events.

Based on any suitable predefined start and end parameters for a remote control session, personalization facility 102 may determine a status of a remote control session between remote control device 204 and media service access device 206. This may include determining whether such a remote control session is active or inactive. FIG. 8 represents a remote control session 808 that may exist between remote control device 204 and media service access device 206. Remote control device 204 may perform a variable frequency AC sweep to detect a user and/or a user gesture at the beginning, end, and/or at any other time prior to, during, and/or or following remote control session 808. In some implementations, a user may provide input to remote control device 204 (e.g., by pressing a button on remote control device 204, holding remote control device 204 in a specific orientation, shaking remote control device 204, providing a voice command, etc.) directing remote control device 204 to perform a variable frequency AC sweep.

A configuration of a remote control device for communicating with media service access device 206 will now be described.

Figure 9:
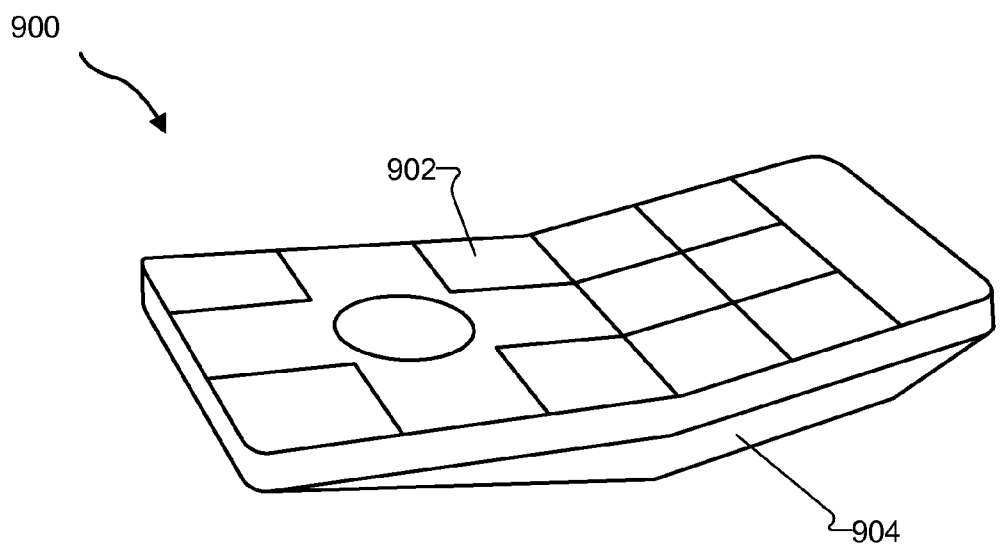
FIGS. 9 and 10 show an exemplary remote control device according to principles described herein.
Figure 10:
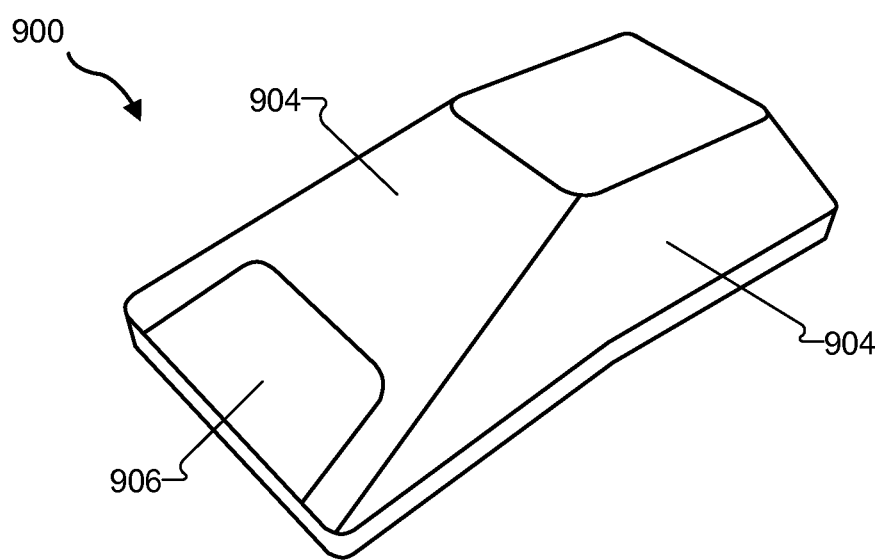

FIGS. 9-10 illustrate an exemplary remote control device 900. As shown, remote control device 900 may include a control panel 902 including a plurality of buttons for receiving user input. Control panel 902 may, for example, include physical buttons that may be depressed by the user in order to make various selections for interacting with one or more other devices, such as media service access device 206. Alternatively, control panel 902 may include, for example, a touch screen and/or a touchpad by which a user may input commands to remote control device 900.

Additionally, remote control device 900 may include an external sensor electrode 904 disposed on an external portion of remote control device 900 that is configured to contact a user while the user is operating remote control device 900. For example, as illustrated in FIGS. 9 and 10, external sensor electrode 904 may extend around an outer portion of remote control device 900. In some implementations, external sensor electrode 904 may include a metallic and/or semi-metallic layer. For example, external sensor electrode 904 may include a metallic or semi-metallic electrode body and/or coating (e.g., paint layer) having conductivity. While external sensor electrode 904 shown as a continuous layer extending around remote control device 900, external sensor electrode 904 may extend around only a portion of remote control device 900. In some implementations, a plurality of separate external sensor electrodes may be disposed on exterior portions of remote control device 900. External sensor electrode 904 may alternatively be formed to any other suitable shape and/or configuration, without limitation.

Remote control device 900 may also include a wireless transmitter 906 for communicating with one or more external devices, such as media service access device 206. Wireless transmitter 906 may include any suitable transmitter for communicating with media service access device 206 and/or one or more other devices via transmission and/or signaling technologies (e.g., infrared and/or radio frequency signals).

Figure 11:
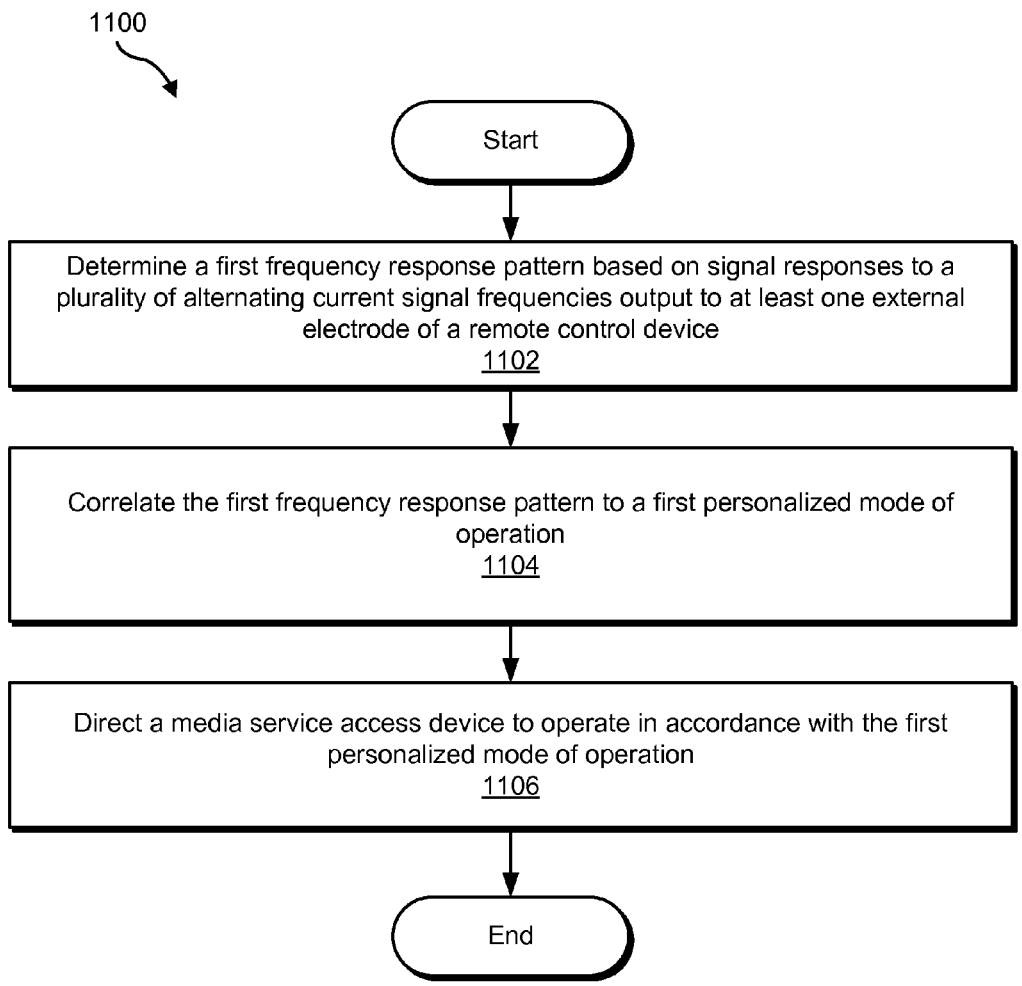
FIG. 11 illustrates an exemplary method for facilitating media service personalization according to principles described herein.
Figure 12:
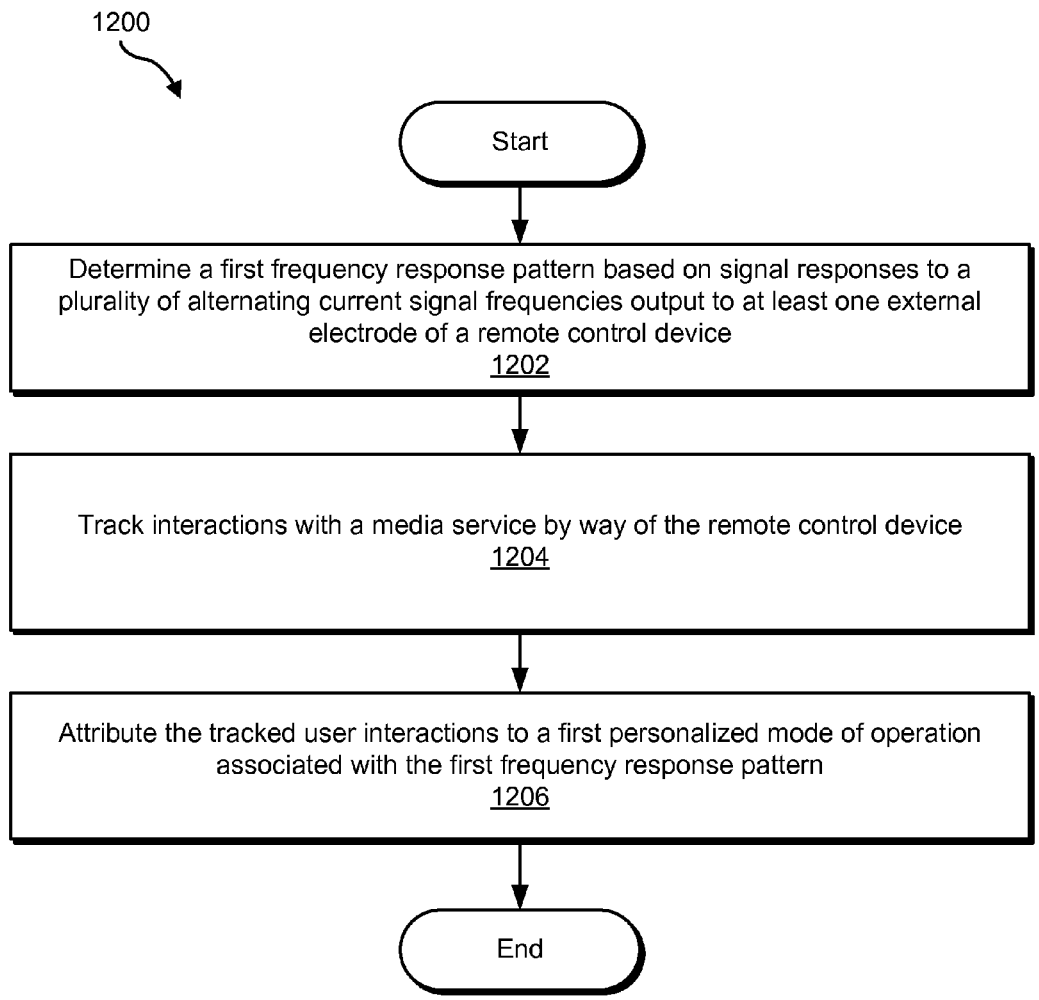
FIG. 12 illustrates another exemplary method for facilitating media service personalization according to principles described herein.

FIGS. 11-12 illustrate exemplary methods 1100-1200 for facilitating media service personalization by a remote control device having a capacitive sensing electrode according to principles described herein. While FIGS. 11-12 illustrate exemplary steps according to certain embodiments, other embodiments may omit, add to, reorder, combine, and/or modify any of the steps shown in FIGS. 11-12. In certain embodiments, one or more of the steps shown in FIGS. 11-12 may be performed by system 100 and/or one or more components or implementations of system 100, such as by a computing device implementing system 100.

In step 1102 of method 1100, a media service personalization system (e.g., system 100) determines a first frequency response pattern based on frequency responses to a plurality of alternating current signal frequencies output to at least one external electrode of a remote control device. Step 1102 may be performed in any of the ways described herein. For example, the media service personalization system may perform a variable frequency AC sweep of the at least one external electrode of the remote control device by outputting a range of AC signal frequencies to the at least one external electrode to determine a frequency response pattern based on AC frequency responses received from the at least one external electrode.

In step 1104 of method 1100, the media service personalization system correlates the first frequency response pattern to a first personalized mode of operation. Step 1104 may be performed in any of the ways described herein. For instance, the media service personalization system may compare the determined frequency response pattern received from the at least one external electrode to one or more stored reference frequency response patterns associated with various personalized modes of operation. If the determined frequency response pattern matches a stored reference frequency response pattern, then the determined frequency response pattern is correlated with a personalized mode of operation associated with the stored reference frequency response pattern.

In step 1106 of method 1100, the media service personalization system directs a media service access device to operate in accordance with the first personalized mode of operation. Step 1106 may be performed in any of the ways described herein. For example, the media service personalization system may direct the media service access device to provide content specific to the user in accordance with user preferences associated with the first personalized mode of operation.

In step 1202 of method 1200, a media service personalization system (e.g., system 100) determines a first frequency response pattern based on frequency responses to a plurality of alternating current signal frequencies output to at least one external electrode of a remote control device. Step 1202 may be performed in any of the ways described herein.

In step 1204 of method 1200, the media service personalization system tracks interactions with a media service by way of the remote control device. Step 1204 may be performed in any of the ways described herein. For example, during a learning phase, user interactions with a remote control device and/or a media service access device may be tracked in order to determine one or more user preferences to be associated with a profile and/or a personalized mode of operation associated with a frequency response pattern corresponding to the user.

In step 1206 of method 1200, the media service personalization system attributes the tracked user interactions to a first personalized mode of operation associated with the first frequency response pattern. Step 1206 may be performed in any of the ways described herein.

In certain embodiments, one or more of the systems, components, and/or processes described herein may be implemented and/or performed by one or more appropriately configured computing devices. To this end, one or more of the systems and/or components described above may include or be implemented by any computer hardware and/or computer-implemented instructions (e.g., software) embodied on at least one non-transitory computer-readable medium configured to perform one or more of the processes described herein. In particular, system components may be implemented on one physical computing device or may be implemented on more than one physical computing device. Accordingly, system components may include any number of computing devices, and may employ any of a number of computer operating systems.

In certain embodiments, one or more of the processes described herein may be implemented at least in part as instructions executable by one or more computing devices. In general, a physical computer processor (e.g., a microprocessor) receives instructions, from a tangible computer-readable medium, (e.g., a memory, etc.), and executes those instructions, thereby performing one or more processes, including one or more of the processes described herein. Such instructions may be stored and/or transmitted using any of a variety of known non-transitory computer-readable media.

A non-transitory computer-readable medium (also referred to as a processor-readable medium) includes any non-transitory medium that participates in providing data (e.g., instructions) that may be read by a computer (e.g., by a processor of a computer). Such a non-transitory medium may take many forms, including, but not limited to, non-volatile media and/or volatile media. Non-volatile media may include, for example, optical or magnetic disks and other persistent memory. Volatile media may include, for example, dynamic random access memory ("DRAM"), which typically constitutes a main memory. Common forms of non-transitory computer-readable media include, for example, a floppy disk, flexible disk, hard disk, magnetic tape, any other magnetic medium, a CD-ROM, DVD, any other optical medium, a RAM, a PROM, an EPROM, a FLASH-EEPROM, any other memory chip or cartridge, or any other non-transitory medium from which a computer can read.

Figure 13:
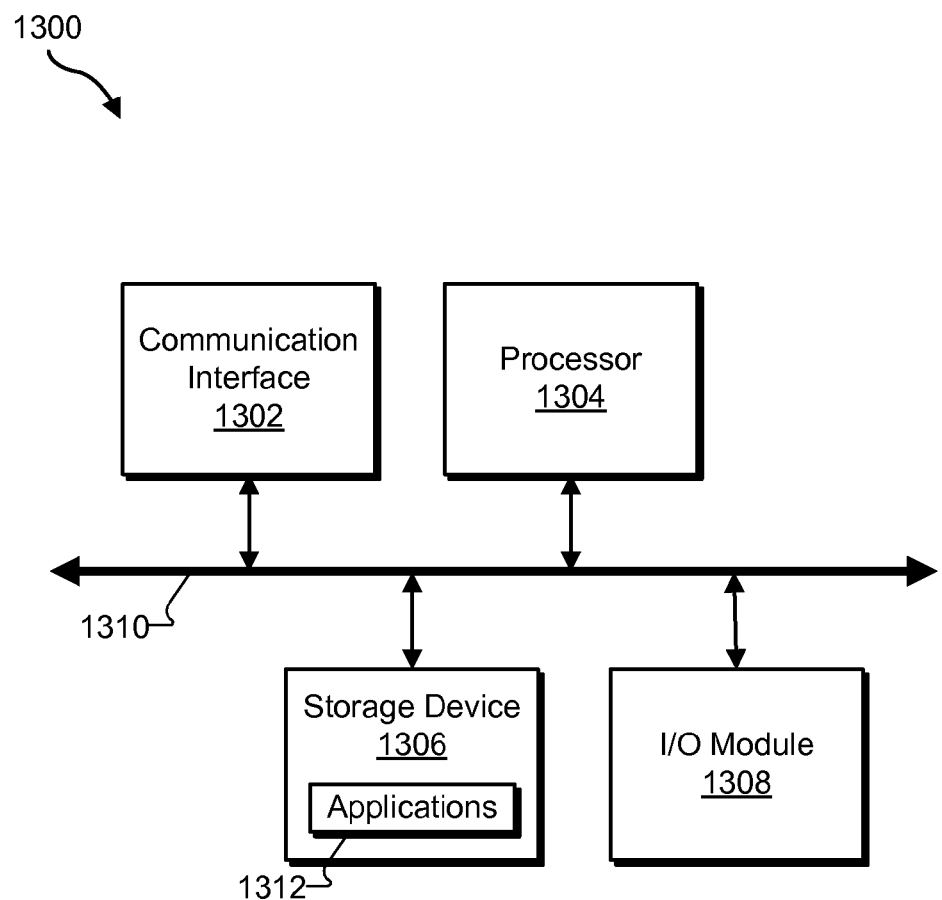
FIG. 13 illustrates an exemplary computing device according to principles described herein.

FIG. 13 illustrates an exemplary computing device 1300 that may be configured to perform one or more of the processes described herein. As shown in FIG. 13, computing device 1300 may include a communication interface 1302, a processor 1304, a storage device 1306, and an input/output ("I/O") module 1308 communicatively connected via a communication infrastructure 1310. While an exemplary computing device 1300 is shown in FIG. 13, the components and/or configuration of components illustrated in FIG. 13 are not intended to be limiting. Additional or alternative components and/or configurations of components may be used in other embodiments. For example, in addition or alternative to being communicatively connected by way of communication infrastructure 1310, one or more components of computing device 1300 may be communicatively connected by way of one or more other suitable interfaces. For instance, communication interface 1302, storage device 1306, I/O module 1308), and/or any other components of computing device may be communicatively coupled directly to processor 1304 via one or more interfaces (e.g., discrete interfaces). Components of computing device 1300 shown in FIG. 13 will now be described in additional detail.

Communication interface 1302 may be configured to communicate with one or more computing devices. Examples of communication interface 1302 include, without limitation, a wired network interface (such as a network interface card), a wireless network interface (such as a wireless network interface card), a modem, an audio/video connection, and any other suitable interface.

Processor 1304 generally represents any type or form of processing unit capable of processing data or interpreting, executing, and/or directing execution of one or more of the instructions, processes, and/or operations described herein. Processor 1304 may direct execution of operations in accordance with one or more applications 1312 or other computer-executable instructions such as may be stored in storage device 1306 or another computer-readable medium.

Storage device 1306 may include one or more data storage media, devices, or configurations and may employ any type, form, and combination of data storage media and/or device. For example, storage device 1306 may include, but is not limited to, a hard drive, network drive, flash drive, magnetic disc, optical disc, random access memory ("RAM"), dynamic RAM ("DRAM"), other non-volatile and/or volatile data storage units, or a combination or sub-combination thereof. Electronic data, including data described herein, may be temporarily and/or permanently stored in storage device 1306. For example, data representative of one or more executable applications 1312 configured to direct processor 1304 to perform any of the operations described herein may be stored within storage device 1306. In some examples, data may be arranged in one or more databases residing within storage device 1306.

I/O module 1308 may be configured to receive user input and provide user output and may include any hardware, firmware, software, or combination thereof supportive of input and output capabilities. For example, I/O module 1308 may include hardware and/or software for capturing user input, including, but not limited to, a keyboard or keypad, a touch screen component (e.g., touch screen display), a receiver (e.g., an RF or infrared receiver), and/or one or more input buttons.

I/O module 1308 may include one or more devices for presenting output to a user, including, but not limited to, a graphics engine, a display (e.g., a display screen, one or more output drivers (e.g., display drivers), one or more audio speakers, and one or more audio drivers. In certain embodiments, I/O module 1308 is configured to provide graphical data to a display for presentation to a user. The graphical data may be representative of one or more graphical user interfaces and/or any other graphical content as may serve a particular implementation.

In some examples, any of the facilities described herein may be implemented by or within one or more components of computing device 1300. For example, one or more applications 1312 residing within storage device 1306 may be configured to direct processor 1304 to perform one or more processes or functions associated with personalization facility 102 and frequency response determination facility 104. Likewise, storage facility 106 may be implemented by or within storage device 1306.

To the extent the aforementioned embodiments collect, store, and/or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:
   determining, by a media service personalization system, a first frequency response pattern based on frequency responses to a plurality of alternating current signal frequencies output to at least one external electrode of a remote control device;
   correlating, by the media service personalization system, the first frequency response pattern to a first personalized mode of operation;
   directing, by the media service personalization system, a media service access device to operate in accordance with the first personalized mode of operation.

2. The method of claim 1, wherein the correlating the first frequency response pattern to the first personalized mode of operation comprises determining that the first frequency response pattern matches a first reference frequency response pattern associated with the first personalized mode of operation.

3. The method of claim 2, wherein the determining that the first frequency response pattern matches the first reference frequency response pattern associated with the first personalized mode of operation comprises determining that the first frequency response pattern matches the first reference frequency response pattern to at least a threshold degree of certainty.

4. The method of claim 1, further comprising directing, by the media service personalization system, a frequency response determination facility of the remote control device to:
   output the plurality of alternating current signal frequencies to the at least one external electrode of the remote control device;
   measure the frequency responses to the plurality of alternating current signal frequencies.

5. The method of claim 4, wherein the directing of the frequency response determination facility of the remote control device to output the plurality of alternating current signal frequencies to the at least one external electrode of the remote control device comprises directing the frequency response determination facility of the remote control device to output a variable frequency alternating current to the at least one external electrode.

6. The method of claim 1, wherein the determining the first frequency response pattern comprises enveloping the frequency responses to the plurality of alternating current signal frequencies by converting the frequency responses from alternating current to time-varying direct current.

7. The method of claim 1, wherein magnitudes of the frequency responses to the plurality of alternating current signal frequencies are proportional to capacitive interactions between a body and the at least one external electrode at the plurality of alternating current signal frequencies.

8. The method of claim 1, further comprising:
   determining, by the media service personalization system, a second frequency response pattern based on frequency responses to another plurality of alternating current signal frequencies output to the at least one external electrode of the remote control device.

9. The method of claim 8, further comprising:
   correlating, by the media service personalization system, the second frequency response pattern to a second personalized mode of operation;
   directing, by the media service personalization system, the media service access device to operate in accordance with the second personalized mode of operation.

10. The method of claim 8, further comprising:
    correlating, by the media service personalization system, the second frequency response pattern to a user gesture.

11. The method of claim 1, wherein the directing the media service access device to operate in accordance with the first personalized mode of operation comprises directing the media service access device to personalize a media service user interface to a first user of the media service access device.

12. The method of claim 11, wherein the directing the media service access device to personalize the media service user interface to the first user comprises providing a personalized view of the media service user interface that includes a menu of media programs personalized to the first user.

13. The method of claim 12, wherein the menu of media programs personalized to the first user comprises a watch list of the first user.

14. The method of claim 1, embodied as computer-executable instructions on at least one non-transitory computer-readable medium.

15. A method comprising:
    determining, by a media service personalization system, a first frequency response pattern based on frequency responses to a plurality of alternating current signal frequencies output to at least one external electrode of a remote control device;

tracking, by the media service personalization system, interactions with a media service by way of the remote control device;

attributing, by the media service personalization system, the tracked user interactions to a first personalized mode of operation associated with the first frequency response pattern.

16. The method of claim 15, further comprising determining, by the media service personalization system, a second frequency response pattern based on frequency responses to another plurality of alternating current signal frequencies output to the at least one external electrode of the remote control device;

correlating, by the media service personalization system, the second frequency response pattern to the first personalized mode of operation;

attributing, by the media service personalization system, the second frequency response pattern to a user gesture.

17. A system comprising:

at least one physical computing device that:

determines a first frequency response pattern based on frequency responses to a plurality of alternating current signal frequencies output to at least one external electrode of a remote control device;

correlates the first frequency response pattern to a first personalized mode of operation;

directs a media service access device to operate in accordance with the first personalized mode of operation.

18. The system of claim 17, wherein the at least one physical computing device correlates the first frequency response pattern to the first personalized mode of operation by determining that the first frequency response pattern matches a first reference frequency response pattern associated with the first personalized mode of operation.

19. The system of claim 17, wherein the at least one physical computing device directs a frequency response determination facility of the remote control device to:

output the plurality of alternating current signal frequencies to the at least one external electrode of the remote control device;

measure the frequency responses to the plurality of alternating current signal frequencies.

20. The method of claim 17, wherein the at least one physical computing device determines a second frequency response pattern based on frequency responses to another plurality of alternating current signal frequencies output to the at least one external electrode of the remote control device.

* * * * *